UNITED STATES PATENT OFFICE.

MARION O. FISHER, OF ALLEN'S HILL, NEW YORK.

FIRE AND WATER PROOF PAINT.

SPECIFICATION forming part of Letters Patent No. 296,324, dated April 8, 1884.

Application filed January 9, 1884. (No specimens.)

*To all whom it may concern:*

Be it known that I, MARION O. FISHER, a citizen of the United States, residing at Allen's Hill, in the county of Ontario and State of New York, have invented certain new and useful Improvements in Fire and Water Proof Roof-Paint; and I do declare the following to be a full, clear, and exact description of the invention, such as will enable others skilled in the art to which it appertains to make and use the same.

My invention relates to improvements in fire and water proof paint compounds, having for its object the provision of a compound which shall preserve and protect wood and metal from the action of the weather, water, fire, &c., and which is especially adapted for the painting of all kinds of roofs.

My invention consists of the following ingredients, combined in substantially the proportions stated, to wit: one (1) barrel of coal-tar, thirty (30) pounds of yellow ocher, thirty-seven (37) pounds of mineral paint, thirty-seven (37) pounds of sulphur, fourteen (14) pounds of alum, and twenty (20) pounds of talc. Yellow ocher, mineral paint, sulphur, alum, and talc, in a dry state, are thoroughly mixed by any suitable means with the coal-tar, and the mixture or compound thus produced is for one hour subjected, immediately before using, to a heat of 260° degrees Fahrenheit.

I am aware that most of the ingredients of my compound have been heretofore used in other combinations as a paint; but by the addition of talc, to which I attach importance, the compound is rendered both fire and water proof. I would therefore have it understood that I do not limit myself to the exact proportions herein described, but hold myself at liberty to make such changes therein as fairly fall within the scope of my invention.

What I claim as my invention, and desire to secure by Letters Patent of the United States, is—

The fire and water proof paint compound herein described, consisting of coal-tar, yellow ocher, mineral paint, sulphur, alum, and talc, compounded in the manner and proportions substantially as herein set forth.

In testimony whereof I affix my signature in presence of two witnesses.

MARION O. FISHER.

Witnesses:
MATTHEW NORGATE,
EDWARD FOY.